United States Patent [19]

Carroll

[11] 4,153,039
[45] May 8, 1979

[54] FOCUSING SOLAR ENERGY APPARATUS

[76] Inventor: John H. Carroll, 3021 Grand Ave., Fillmore, Calif. 93014

[21] Appl. No.: 757,618

[22] Filed: Jan. 7, 1977

[51] Int. Cl.² ............................................. F24J 3/02
[52] U.S. Cl. .................................................. 126/271
[58] Field of Search ............... 126/270, 271; 237/1 A; 165/133, 174; 350/293, 299; 250/203 R

[56] References Cited

U.S. PATENT DOCUMENTS

| | | | |
|---|---|---|---|
| 1,989,999 | 2/1935 | Niederle | 126/271 |
| 2,133,649 | 10/1938 | Abbot | 126/271 |
| 2,247,830 | 7/1941 | Abbot | 126/271 |
| 3,154,141 | 10/1964 | Huet | 165/133 |
| 3,847,136 | 11/1974 | Salvail | 126/271 |
| 3,985,119 | 10/1976 | Oakes, Jr. | 126/271 |
| 4,000,734 | 1/1977 | Matlock et al. | 126/271 |
| 4,003,364 | 1/1977 | Balkus, Jr. | 126/271 |
| 4,010,732 | 3/1977 | Sawata et al. | 126/271 |
| 4,024,908 | 5/1977 | Meckler | 126/271 |
| 4,074,678 | 2/1978 | Posnansky | 126/271 |

FOREIGN PATENT DOCUMENTS

131069  1/1949  Australia ..................... 126/270

Primary Examiner—James C. Yeung
Attorney, Agent, or Firm—Jack C. Munro

[57] ABSTRACT

An apparatus employing cylindrical focusing parabolic mirrors (parabolic troughs) of an optimized configuration capable of being manufactured by techniques of mass production to focus sunlight onto a specifically designed heat pipe which is to carry water or other heat transfer fluid. Focused sunlight energy is absorbed by the pipe, converted to thermal energy and transferred to heat the fluid in the pipe. Groups of mirrors are sequentially arranged so that the fluid in the pipes progressively absorbs more heat as it travels through the heat pipe. At some point in the fluid movement, depending upon the intensity of the specular sunlight the fluid, if liquid, may be converted to vapor. Transfer liquids other than water with higher boiling points may be used within the heat pipe and exit from the heat pipe in the liquid state. In either case, the steam, hot gas or superheated liquid is transmitted to a collector system which is then transported by standard steam pipes enclosed within a silvered glass envelope to a central thermal-/electrical generating station. Collector mirror arrays are mounted to permit a single tracking motor to steer a large number of mirrors. All components are optimized for low maintenance and low cost to manufacture.

10 Claims, 9 Drawing Figures

Fig. 9.

FOCUSING SOLAR ENERGY APPARATUS

BACKGROUND OF THE INVENTION

Considerable published theoretical work on solar thermal electrical generating equipment precedes the subject matter of this invention. All of the prior effort is concerned with capturing and using the most solar energy for the lowest cost. This invention is concerned with design improvement and manufacturing which will greatly reduce the cost of generating heat energy from the sun.

SUMMARY OF THE INVENTION

The subject matter of this invention is believed to be summarily described in the Abstract Of The Disclosure and reference is to be had thereto.

The advantages of this invention are to be summarized as follows.

A. Mirror Design

A parabolic mirror configuration which will allow the reflective mirror surface and heat pipe to be covered by a sheet of glass, thus greatly reducing weathering effects and maintenance.

B. Heat Pipe Design

A heat pipe which includes light-trapping sharp fins which send reflected rays of sunlight inward toward the pipe. The heat pipe also includes strengthening and heat transfer ribs which improve the efficiency of the conversion of focused incidental sunlight to thermal energy.

C. Collector Mounting Design

Each collector, which includes the trough shaped mirror and a portion of the heat pipe, is mounted upon supporting structure. Several of the collectors are connected to a tracking assembly. The tracking assembly is operated by a single motor and varies the angle of tilt of the collectors so that each collector directly faces the sun during the entire daylight hours.

D. Valving and Transfer Pipe Design

By the proper placement of adjustable check valves, the flow rate of the heat transfer liquid through the collector system can be automatically controlled according to variations in solar intensity. The use of silvered glass envelopes around the liquid collection transfer conduits allow long distance transfer of the hot liquids without significant energy losses.

E. Method of Manufacture of The Mirrors

Previous methods of manufacturing of precise parabolic trough mirrors was a time consuming and expensive procedure. Within this invention, the mirror is manufactured by automatic techniques in mass production, thereby producing a mirror at a substantially reduced cost.

F. The Method Of Manufacture Of The Heat Pipe

The heat pipe is designed so that it can be inexpensively manufactured from copper, brass or aluminum stock. The method of manufacture of the other remaining components within the structure of this invention are all capable of either mass production or exist as standard stock items.

The structure of this invention will provide for the construction of a solar thermal electric plant at a cost competitive with other methods of power generation which previously has not been the situation. The components within the structure of this invention have all been designed to function for a substantial number of years without repair or replacement. Ease of plant maintenance is one of the primary objectives in the design of the structure of this invention.

DETAILED DESCRIPTION OF THE SHOWN EMBODIMENT

Figure 1:
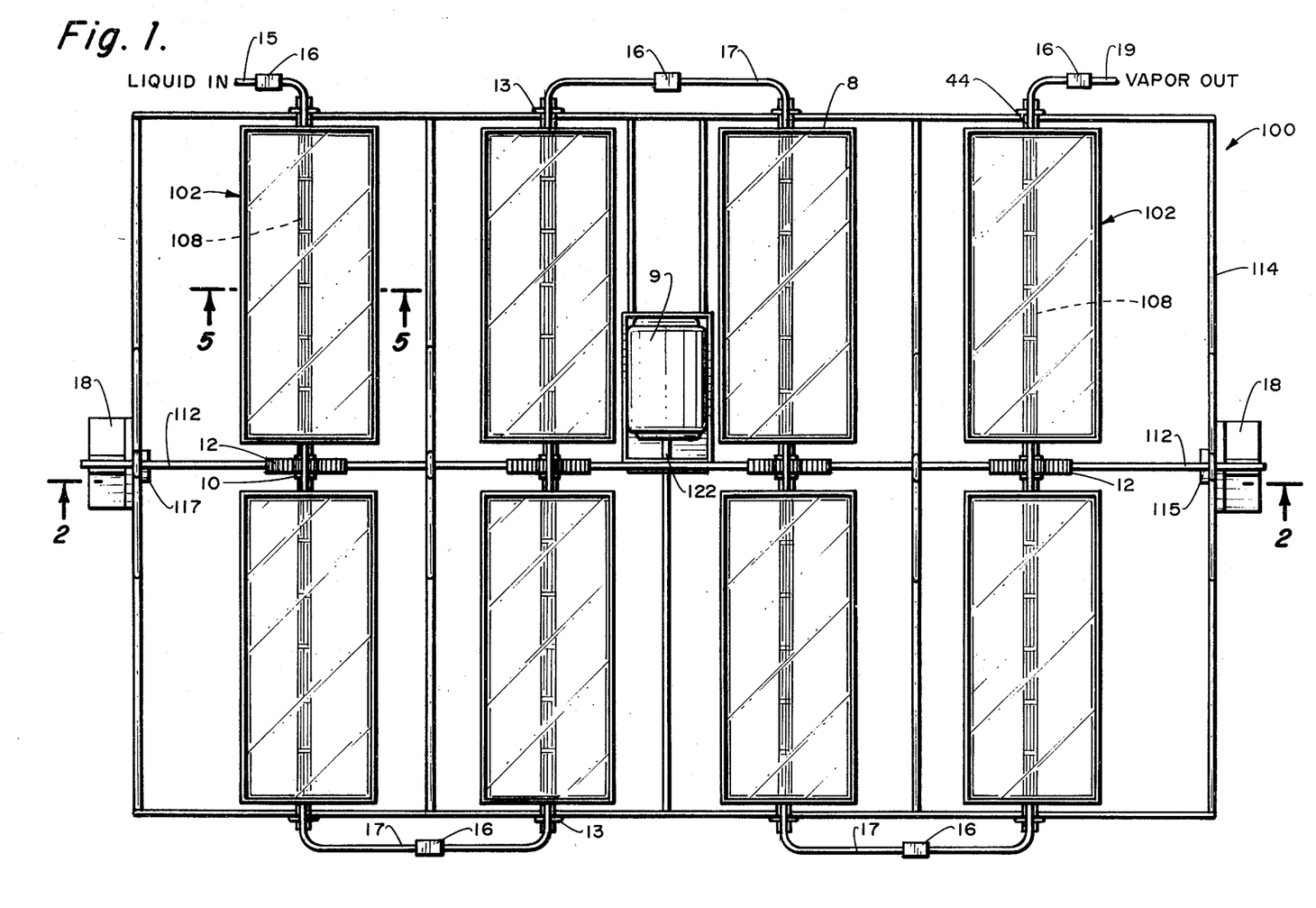
FIG. 1 is a plan view of a typical structural unit of this invention incorporating eight separate collector units mounted upon a single supporting assembly and synchronously movable by a single motor assembly about one axis with the overall structure unit being movable about a second axis.
Figure 2:
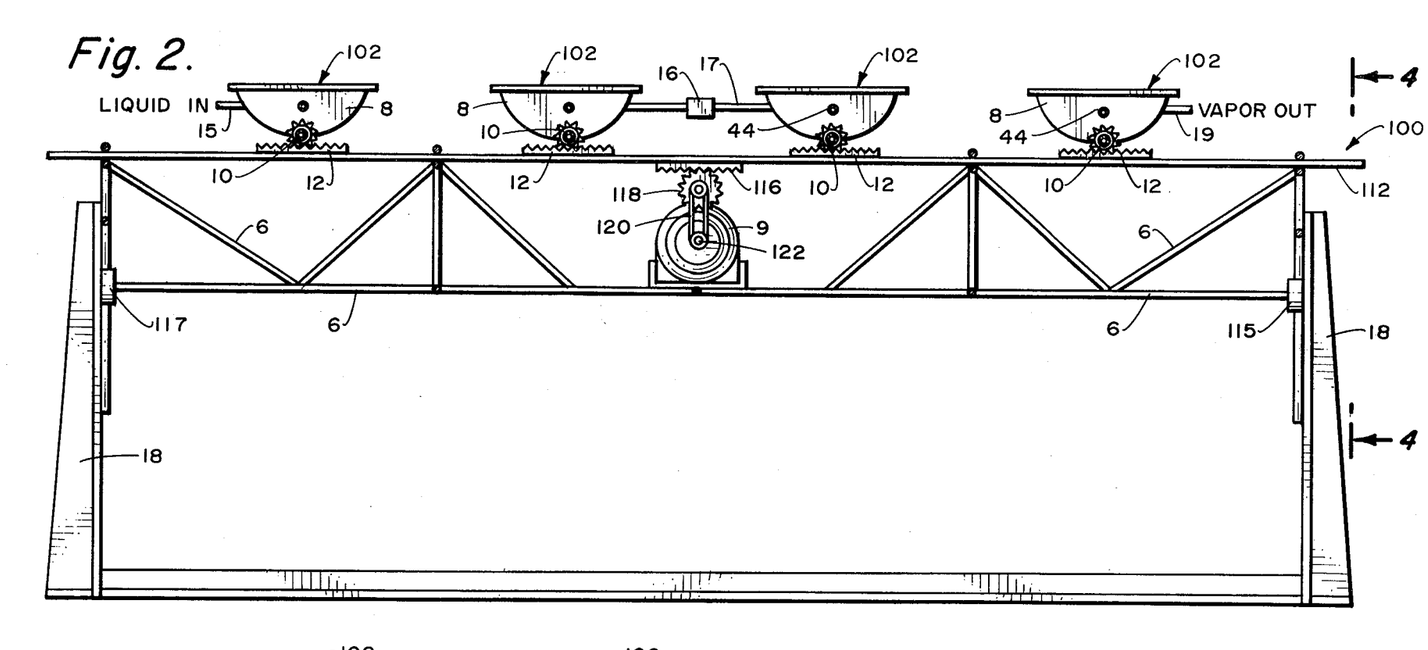
FIG. 2 is a cross-sectional view taken along line 2—2 of FIG. 1 showing each of the collector units at the mid-point position of its total amount of movement with respect to the supporting frame.

Referring particularly to FIG. 1, there is shown an assembly 100 which is composed of a plurality of separate collector units 102 which are interconnected in a series arrangement which will become apparent further on in the specification. Each of the collector units includes a trough-shaped mirror 48 which is parabolic in cross-section. Within the embodiment shown in FIG. 1, there are eight collector units 102 located within the assembly 100. In actual practice, there will normally be several assemblies 100 interconnected together in a series arrangement.

It is to be noted that within each assembly 100 shown within FIG. 1, there are eight of the collector units 102. Again, the number of the collector units 102 located within each assembly 100 is considered to be a matter of choice and the number could be less or could be greater.

Figure 9:
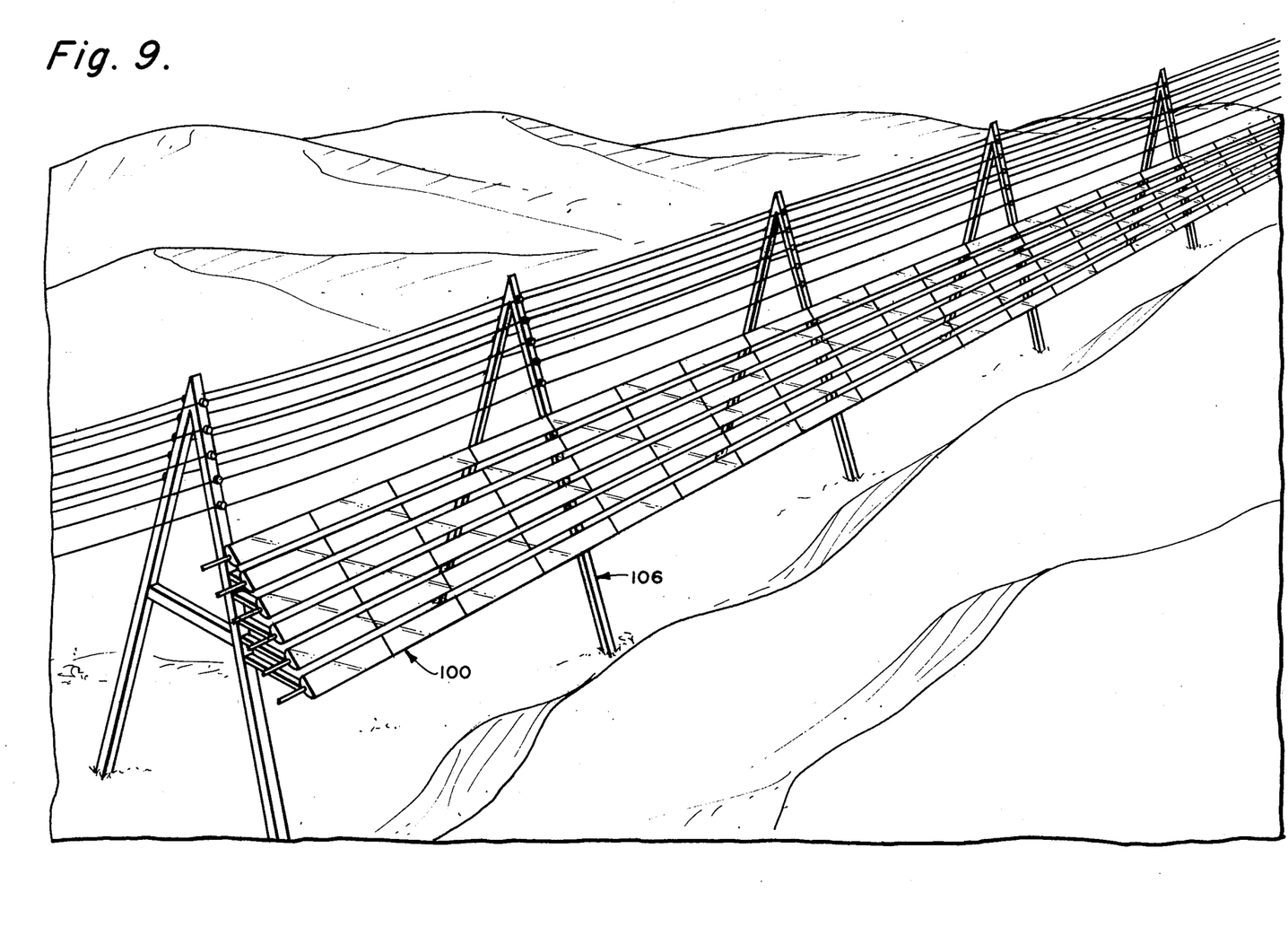
FIG. 9 is an isometric view of an alternate collector mounting assembly movable only about one axis (in the East-West direction) utilizing conventional power transmission line supports as support for the collector mounting assembly.

Referring to the structure of FIGS. 1-8 of the drawings, the longitudinal dimension of each of the collector units 102 is to be mounted in a North-South direction with the face of each of the collector units 102 to be directly facing the sun. In certain installations, it may be desirable to have a longitudinal axis of each of the collector units 102 to be positioned in an East-West direction. Referring particularly to FIG. 9, such an East-West mounting of the assemblies 100 is diagrammatically shown upon spaced apart power poles 106. The power poles 106 are used as the supporting structure for the assemblies 100.

Each of the mirrors 48 is to be designed into a particular shape or a particular class of shapes which can be defined as a parabola with a focal length (f) and aperture width (a) in the following relationship:

a/f=4.5 to 5.5.

This defines a group of parabolas which optimize the design of these collectors from the points of view of ease of maintenance, protection of the reflective surface and minimizing heat loss.

Each of the collector units 102 are formed to include a trough shaped housing, the internal chamber of which is walled by the mirror 48. The ends of the housing are closed by a pair of end plates 8. Extending through the end plates 8 is a heat pipe assembly 108. The heat pipe assembly 108 is spaced from the mirror 48 and is positioned within the enclosure made by the mirror body and the cover.

To protect the delicate reflective surface of the mirror 48 from dust and moisture which is capable of causing pitting and corrosion, a transparent cover 52 in the form of glass is employed within each collector unit 102. The use of the cover 52 also minimizes convective heat losses.

The cover 52 is supported by the lips 46 formed at the upper free edges of the mirror 48. The cover 52 is secured in position thereon by means of retaining member 45 which is to be secured directly to the mirror body. It is to be understood that, in all probability, there will be appropriate sealing or caulking between the lips 46 and the member 45 about the edge of the cover 52 to prevent moisture and dust from entering the internal chamber of each of the collector units 102.

The mirror 48 would normally be manufactured of a metal, aluminum or stainless steel being the most preferable choices. The mirrors 48 are to be formed to a precise size by the industrial process known as "roll-forming". The use of roll-forming to manufacture the parabolic trough mirror has several advantages and these are: Achieving close tolerances which provide precise optical finished mirror, the concave surface of the rolled sheet mirror can be highly polished in the manufacturing process simply by using a set of rollers with a highly polished micro-surface. This eliminates the need for a laborous buffing operation. Additionally, roll-forming is a fast linear process which produces the mirrors inexpensively. Special features of the mirror can be formed simultaneously with the rolling operation.

Located at the mist point of each mirror 48 is a longitudinal recess 110. This recess 110 is located parallel to the longitudinal center axis of each of the collector units 102. The recess 110 extends along the entire length of each of the mirrors 48 (including within each end plate 8).

Within each recess 110 is to be mounted a drive shaft 56. Each of the drive shafts 56 is fixedly mounted to its respective body of its mirror 48. It is to be noted that the recess 110 is formed within the portion of the reflective surface of the mirror 48 which is shaded by the location of the heat pipe 108.

The drive shaft 56 of each collector unit 102 is secured to a drive shaft gear 10. It is to be noted with the embodiment shown in FIG. 1 that there are only four in number of the drive shaft gears 10 with a single drive shaft gear 10 being located between adjacent aligned collector units 102. The drive shaft gears 10 are arranged in an in-line manner. Each drive shaft gear 10 operatively connects with a gear rack 12. The gear racks 12 are interconnected together into a single unit by being attached to elongated bar 112. The bar 112 is low frictionally movably mounted upon the frame 114 of the assembly 100. In other words, the bar 112 is permitted a limited amount of oscillatory movement with respect to the frame 114. It is to be understood that the free end of each of the drive shafts 56 is rotatably mounted within a bearing 13 which is mounted upon the frame 114.

Fixedly mounted upon the bar 112 is a drive gear rack 116. The gear rack 116 is operatably connected to a drive gear 118. The drive gear 118 is rotatably driven in either a clockwise or counterclockwise direction by means of a drive belt 120. The drive belt 120 is operated by the motor shaft 122 of motor 9. The motor 9 is supported upon the frame 114.

Figure 3:
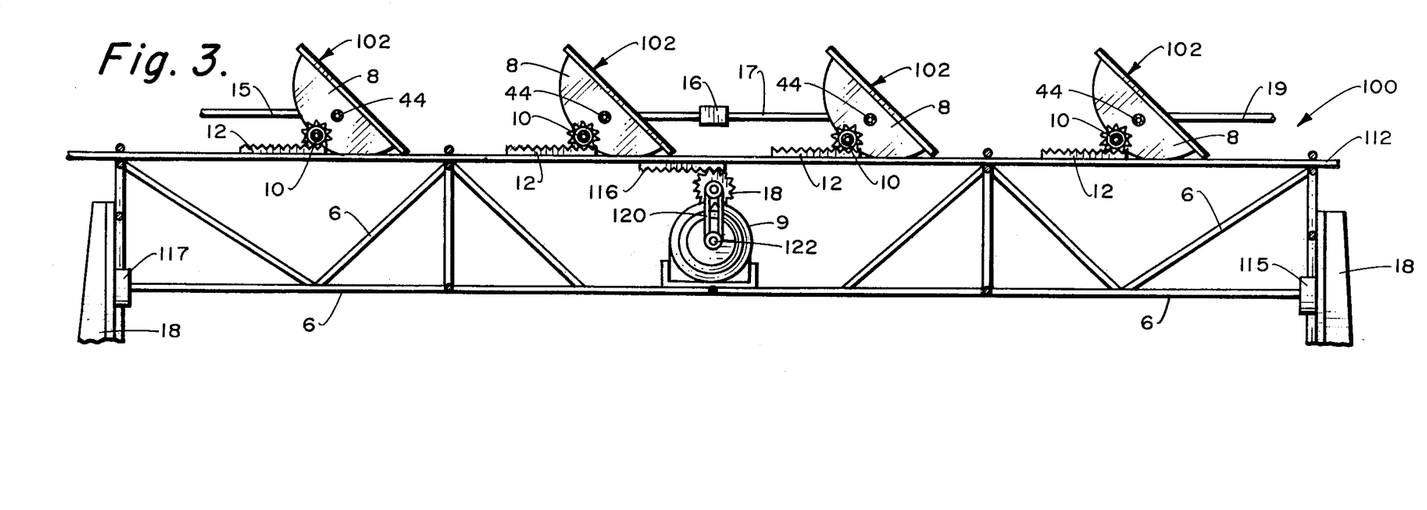
FIG. 3 is a view similar to FIG. 2 but showing the collector units at one end of its total range of movement.
Figures 4, 5:
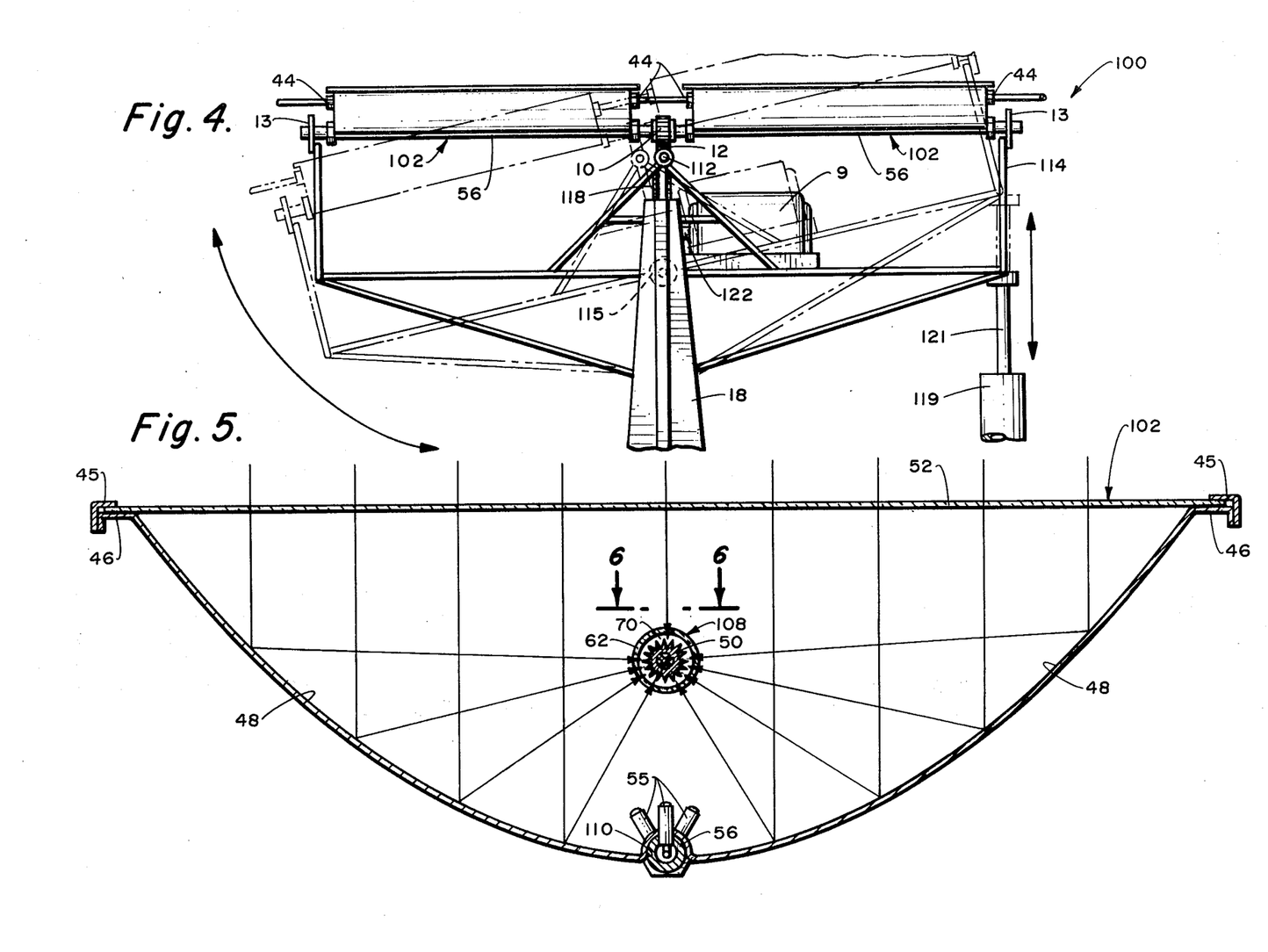
FIG. 4 is an end view of the structure of this invention taken along line 4—4 of FIG. 2.
FIG. 5 is a cross-sectional view of a single collector unit taken along line 5—5 of FIG. 1.
Figure 6:
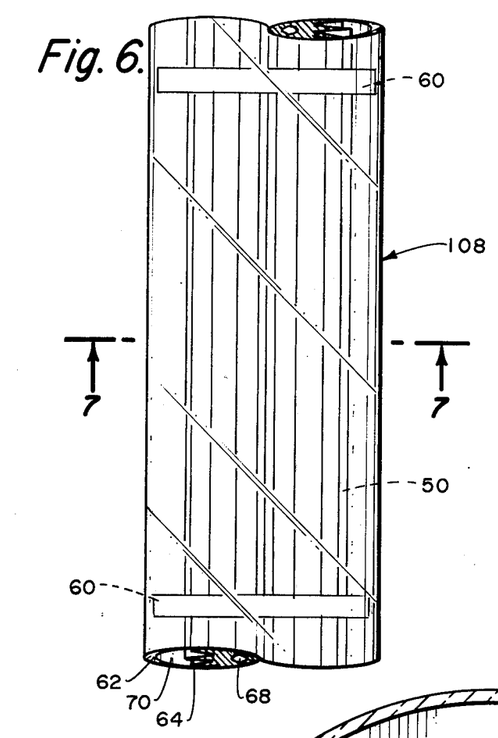
FIG. 6 is a cop view of the heat pipe incorporated within each of the collector units taken along line 6—6 of FIG. 5.
Figure 7:
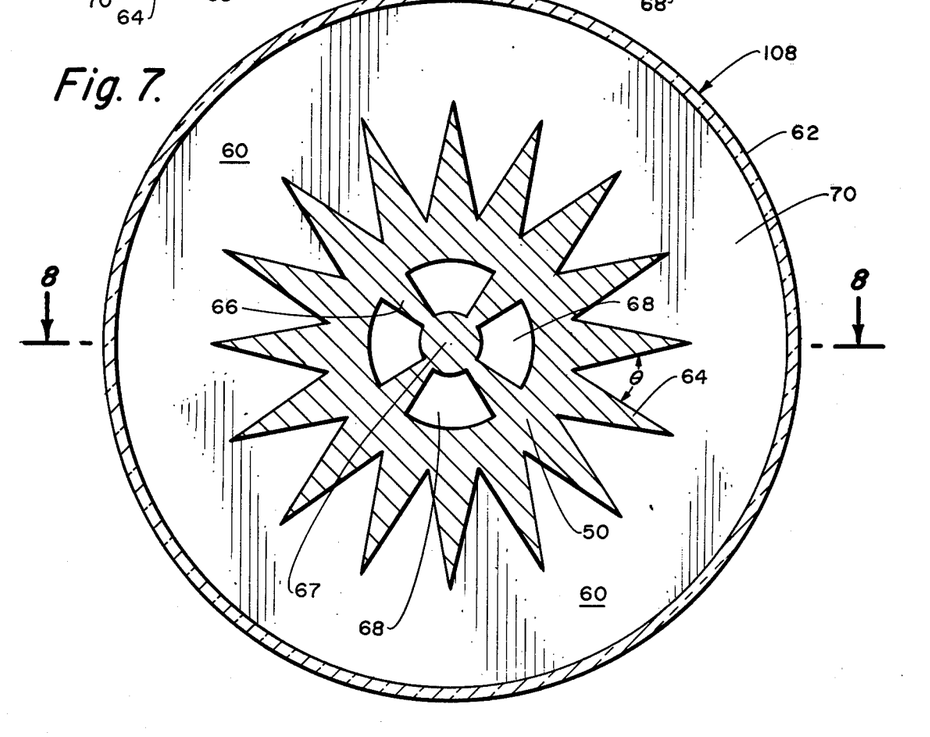
FIG. 7 is a cross-sectional view through the heat pipe incorporated within this invention taken along line 7—7 of FIG. 6.
Figure 8:
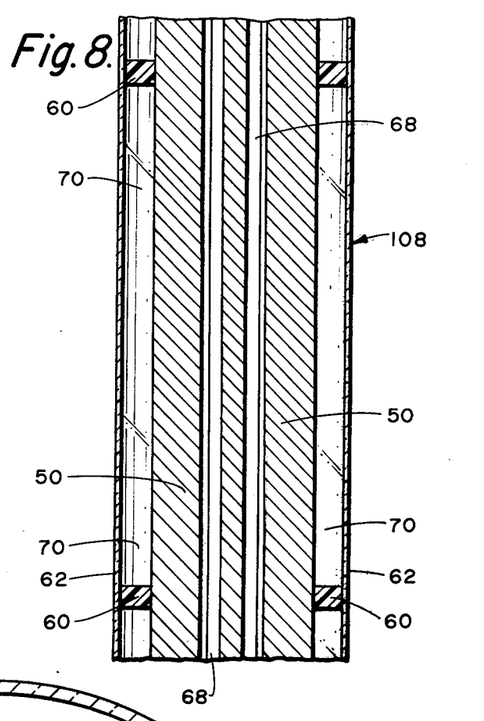
FIG. 8 is a longitudinal sectional view through the heat pipe taken along line 8—8 of FIG. 7.

It can be readily seen by operation of the motor 9, the bar 112 is caused to move linearly. In one direction of the bar 112, the collector units 102 are caused to tilt, such as shown in FIG. 3 of the drawings. Opposite directional movement of the bar 112 causes the collector units 102 to tilt in the opposite direction. The tilting of the collector units 102 is necessary so as to directly face each of the collector units as the sun moves across the sky. The single motor 9 operates eight in number of the collector units 102 or all of the collector units 102 located within the assembly 100. Within each assembly 100, a single motor operates in unison each of the collector units 102.

It is considered to be within the scope of this invention that the adjustment procedure accomplished through motor 9 could be used to "follow" the sun across the sky without any other adjustment means being provided. However, to compensate for the height of the sun "in the sky" during the different seasons, the entire frame 114 is pivotable about bearings 115 and 117. Bearing 115 is mounted in one supporting post 18 of frame 114 with bearing 117 mounted in the other supporting post 18 of frame 114. The adjustment may be provided through a hydraulic actuator 119 which includes a piston rod 121 which is attached to frame 114.

It is envisioned that the operation of the motor 9 will be accomplished automatically. One way in which this can be accomplished automatically is by the inserting of a photosensor switching assembly 55 within one of the internal compartments of one of the collector units 102. This photosensor switching assembly 55 will normally be composed of three spaced apart separate photosensors. The photosensor assembly 55 will be electrically connected to the motor 9 and will be capable of causing rotation of the motor 9 in either a clockwise or counterclockwise direction and will also be capable of starting instantly the operation of the motor 9 or stopping instantly the operation of motor 9.

The location of the photosensor assembly 55 is such that if the collector units 102 within a single assembly 100 are directly facing the sun's rays, each of the three photosensors within the photosensor assembly 55 will be shaded from the sun's rays by the heat pipe 108. The center photosensor faces directly at the heat pipe 108 with one of the remaining photosensors facing slightly East and the remaining photosensor facing slightly West. Upon the sun's rays contacting one of the photosensors, the motor 9 is instructed to rotate in a given direction which will cause movement of the collector units 102 to shade again all three photosensors. In this manner, each of the collector units 102 is maintained directly facing the sun's rays.

It is to be understood that the sun tracking arrangement will be different from what part of the world the apparatus is located. For example, different sun tracking arrangements will be necessary for an Equator located apparatus versus a Temperate Zone apparatus and an Arctic located apparatus. Also, for the structure shown within FIG. 10, a different type of arrangement for tracking the sun would have to be employed. The arrangement could be using a photosensor assembly similar to the assembly 55 and operate a motor and gear rack assembly similar to what was previously described.

The heat pipe 108 is basically composed of three separate components, the metallic body 50, spacing member 60 and envelope 62. The outer surface of the body 50 is deeply grooved with specially designed fins 64 that are to function to trap the light rays of the sun by multiple reflections inward within each of the grooves between adjacent fins. The external crevice angle $\theta$ is to be located within a certain range. This range is to be so that the fins 64 are to be quite sharp and the crevices quite narrow. The preferable range is so that the angle $\theta$ is less than forty-five degrees and a most preferable $\theta$ angle is twenty-two and one-half degrees.

The external surface of the body 50 is micro-roughened by processes such as sandblasting or chemical mist etching. Not only do the fins 64 function to decrease reflection of the light rays away from the body 50 but also the roughening of the external surface of the body 50 decreases reflection of light rays away from the pipe.

The basic shape of the body 50 is radially symmetrical to permit periodic rotation, if desired, to insure even wear within the collector unit. The symmetry of the body 50 also facilitates passage of the body 50 through appropriate openings located within the end plate 8.

The solid central core 67 of the heat pipe body 50 is attached by heat transfer ribs 66 to the fin 64 portion of the body 50. As a result, there are four in number of separate heat transfer fluid passages 68 within each section of the heat pipe body 50. This allows the possibility of using the same pipe for a counter flow liquid return, the upper two chambers being used for the return, the lower two for delivery in low temperature applications.

In addition to the exterior surface of the body 50 being roughened, it is also to be rendered a darkened color such as flat black.

The purpose of the heat pipe 108 within the subject invention is threefold: (1) to trap light rays with a minimum of lost reflection, (2) to transform solar radiation energy to thermal energy and (3) to conduct the thermal energy within and transfer it to liquid (or gas) contained within openings 68.

The body 50 of the heat pipe assembly 108 is enclosed in a thin walled tubular transparent envelope 62 which may be constructed of glass. The envelope 62 is evenly spaced from the body 50 by means of spacing washers 60 which can be formed of any suitable material, such as asbestos or the like. The asbestos washers 60 are to be located at desirable intervals along the longitudinal length of the heat pipe body 50. The material of construction of the washers 60 is to be so that the washers will be sufficiently compressible to allow for thermal expansion of the pipe body 50. In addition to spacing the envelope 62 from the body 50 creating airspace 70, the washers 60 act to reduce convection (or lost heat energy) by creating closed segments of airspace 70 along the length of the heat pipe.

Each of the heat pipes assemblies 108 of each collector unit 102 is connected together in a series arrangement. That is, the fluid being conducted through the passages 68 are passed from one heat pipe to another until the liquid is conducted through the entire assembly 100. Separate links of conduit 17 are provided to interconnect adjacent collector units 102. Within the conduit 17 there is provided a check valve 16. The fluid is supplied to the first series of collector units 102 through fluid inlet conduit 15. The fluid is removed from the last of the series of collector units 102 through fluid outlet conduit 19.

In operation of the apparatus of this invention, liquid, such as water, or other fluid is conducted to within the joined assemblies 100. As the fluid passes through openings 68 of each collector unit 102, the fluid is raised in temperature. At some point, the liquid will change from the liquid state to the gaseous state and become steam. As the steam continues to pass through the collector units 102, the steam becomes superheated steam. At some preselected point which it is known that this steam is at a desired state, the steam is conducted to a main fluid delivery pipe (not shown) which then transports the superheated steam to an electricity generating plant (not shown). It is to be understood that the main fluid delivery pipe would be appropriately insulated to prevent significant heat loss prior to this superheated steam arriving at the electricity generating plant, such as by enclosing the main fluid delivery pipe in a silvered glass envelope.

It is to be understood that the check valve 16 will normally be a one way type of check valve which prevents backflow. These check valves 16 are also to be placed between each adjacent pair of collector units 102 so that pressure increases are relieved only by flow in the forward direction. New fluid enters the system only when back pressure in the first pair of collector units fails below entry pressure and fluid travels between a pair of collector units similarly only when back pressure fails below entry pressure. Thus, by the use of high quality check valves 16, the fluid flowing through the system becomes a passive, automatic function of the apparatus.

Upon the pressure and temperature of the fluid achieving a minimum desired level, the fluid will be permitted to pass through an exit valve into the main fluid delivery line. There will be several spaced apart exit valves along the entire length of the device.

The apparatus of this invention is designed to use a variety of heat transfer fluids, both liquid and gaseous, including water and air. A system designed for water can accommodate most other fluids as operational problems such as freezing and corrosion are most severe with water. Water and steam have a significant advantage in being immediately adaptable to conventional steam turbines. No variation of the heat pipe 108 design is necessary for liquids other than water.

The design of the heat pipe might be improved by the addition of a finned or grooved interior surface (located within the opening 68), and by incorporation of a helical twist to the pipe along its length.

The frame 114, which contains a single assembly 100, is fixedly mounted upon supporting posts 18 of the apparatus of this invention.

What is claimed is:

1. A solar energy producing apparatus comprising:
    a fixed support;

a mounting assembly connected to said fixed support, said mounting assembly being pivotly mounted about a first picot axis;

at least one in number solar energy collecting unit collected to said assembly, said collecting unit being pivotly mounted about a second pivot axis upon said mounting assemby, said first pivot axis being substantially perpendicular to said second pivot axis, said collecting unit being in the shape of an elongated trough defining an enclosed longitudinal smooth walled chamber having a longitudinal center axis, said smooth walled chamber being parabolic in transverse cross-section, the interior surface of said chamber being light reflective;

a heat pipe assembly located within said enclosed chamber and positioned parallel to the longitudinal axis of said trough, said heat pipe assembly being spaced from said wall of said chamber and located at the approximate middle in cross-section of said enclosed chamber, said heat pipe assembly including an elongated metallic tubular body which has an interior closed fluid conducting conduit therein;

a transparent cover attached to the edges of said wall of said chamber closing said chamber to the ambient, the position of said heat pipe assembly being predetermined in view of the selected parabolic curve of said chamber wall so that light rays passing substantially perpendicular through said transparent cover are reflected from said wall of said interior chamber toward said heat pipe assembly; and the exterior surface of said tubular body including a plurality of spaced-apart, sharp-walled grooves thereby forming a plurality of spaced-apart pointed fins extending radially from said longitudinal center axis of said tubular body, said grooves being constructed to reflect substantially all contacting light rays back and forth between adjacent pairs of said fins with each reflection moving nearer said longitudinal center axis of said tubular body, a transparent envelope evenly spaced from and totally enclosing said tubular body, said outermost end of said sharp pointed fins being significantly spaced from the inner wall of said transparent envelope to achieve an air space therebetween thereby minimizing heat losses due to convection and conduction.

2. The apparatus as defined in claim 1 wherein:

the exterior surface of said tubular rays being roughened to deter reflection of light rays away from said tubular body and also being of a dark color to facilitate absorption of the light rays into said tubular body.

3. The solar energy producing apparatus as defined in claim 1 wherein:

said transparent envelope being evenly spaced from said tubular body by spacing means, said spacing means comprising a plurality of longitudinally spaced apart thin washers located between said tubular body and said transparent envelope.

4. A solar energy producing apparatus comprising:

a fixed support;

a mounting assembly connected to said fixed support, said mounting assembly being pivotly mounted about a first pivot axis;

at least one in number solar energy collecting unit connected to said assembly, said collecting unit being pivotly mounted about a second pivot axis upon said mounting assembly, said first pivot axis being substantially perpendicular to said second pivot axis, said collecting unit being in the shape of an elongated trough defining an enclosed longitudinal smooth walled chamber having a longitudinal center axis, said smooth walled chamber being parabolic in transverse cross-section, the interior surface of said chamber being light reflective;

a heat pipe assembly located within said enclosed chamber and positioned parallel to the longitudinal axis of said trough, said heat pipe assembly being spaced from said wall of said chamber and located at the appropriate middle in cross-section of said enclosed chamber, said heat pipe assembly including an elongated metallic tubular body which has an interior closed fluid conducting conduit therein;

a transparent cover attached to the edges of said wall of said chamber closing said chamber to the ambient, the position of said heat pipe assembly being predetermined in view of the selected parabolic curve of said chamber wall so that light rays passing substantially perpendicular through said transparent cover are reflected from said wall of said interior chamber toward said heat pipe assembly;

tracking means connected to said collecting unit, said tracking means to cause movement of said collecting unit so that the sun rays continuously strike said cover substantially perpendicular; and photosensor means attached to said wall of said chamber along said longitudinal center axis, said photosensor means to be activatable by the suns rays to automatically cause movement of said collecting unit to continuously maintain the position of said collecting unit so that the suns rays pass through said cover substantially perpendicular.

5. The apparatus as defined in claim 4 wherein:

the exterior surface of said tubular body including a plurality of spaced-apart, sharp walled grooves thereby forming a plurality of spaced-apart, sharp pointed fins extending radially from the longitudinal center axis of said tubular body, said grooves being constructed to reflect contacting light rays between adjacent pairs of said fins, a transparent envelope evenly spaced from and totally enclosing said tubular body.

6. The apparatus as defined in claim 5 wherein:

the exterior surface of said tubular body being roughened to deter reflection of light rays away from said tubular body and also being of a dark color to facilitate absorption of the light rays into said tubular body.

7. In combination with the solar energy producing apparatus, a solar energy collecting unit comprising:

said collecting unit being in the shape of an elongated trough defining an enclosed longitudinal smooth walled chamber having a longitudinal center axis, said smooth walled chamber being parabolic and transfers cross section, the interior surface of said chamber being light reflective;

a heat pipe assembly located within said closed chamber and positioned parallel to the longitudinal axis of said trough, said heat pipe assembly being spaced from said wall of said chamber and located at the approximate middle in cross section of said enclosed chamber, said heat pipe assembly including an elongated heat absorbing tubular body which has an interior closed fluid conducting conduit therein, the exterior surface of said tubular body including a plurality of spaced-apart sharp walled grooves thereby forming a plurality of spaced-apart sharp pointed fins extending radially from said longitudinal center axis of said tubular body, said grooves being constructed to reflect substantially all contacting light rays back and forth between adjacent pairs of said fins with each reflection moving nearer said longitudinal center axis, a transparent envelope evenly spaced from and totally enclosing said tubular body, said transparent envelope being evenly spaced from said tubular body by spacing means, said spacing means comprising a plurality of longitudinally spaced apart thin washers located between said tubular body and said transparent envelope.

8. The combination as defined in claim 7 including:
said enclosed chamber including a transparent cover attached to the edges of said wall of said enclosed chamber enclosing said chamber to the ambient, the position of said heat pipe assembly being predetermined in view of the selected parabolic curve of said chamber wall so that light rays passing substantially perpendicular through said transparent cover are reflected from said wall of said interior chamber toward said heat assembly.

9. The combination as defined in claim 8 wherein:
the exterior surface of said tubular body being roughened to deter reflection of light rays away from said tubular body and also being of a dark color to facilitate absorption of the light rays into said tubular body.

10. The combination as defined in claim 9 wherein:
said smooth walled chamber having a shape defined within a range of values represented by the formula of $(a/f) = 4.5$ to $5.5$ where $(f)$ is focal length and $(a)$ is aperture width.

* * * * *